United States Patent [19]

Inaba et al.

[11] Patent Number: 4,462,906

[45] Date of Patent: Jul. 31, 1984

[54] FILLER FOR ELECTROMAGNETIC FILTERS

[75] Inventors: Nobukatsu Inaba, Chiba; Satoshi Yoshida, Funabashi, both of Japan

[73] Assignee: Japan Organo Co., Ltd., Japan

[21] Appl. No.: 449,829

[22] Filed: Dec. 14, 1982

[30] Foreign Application Priority Data

Jan. 8, 1982 [JP] Japan .............................. 57-561[U]

[51] Int. Cl.³ .............................................. B01D 35/06
[52] U.S. Cl. ...................................... 210/222; 210/695
[58] Field of Search ........................ 210/222, 223, 695; 209/223 R, 223 A, 224, 231, 232; 55/100

[56] References Cited

U.S. PATENT DOCUMENTS 4,033,864 7/1977 Nolan et al. .................... 209/223.1

*Primary Examiner*—Frank Sever
*Attorney, Agent, or Firm*—McGlew and Tuttle

[57] ABSTRACT

Disclosed is a filler for electromagnetic filters comprising a spiral magnetic material having an aperture in its center, an outer ring surrounding the spiral magnetic material and having a thickness greater than that of said spiral magnetic material, and a woolly magnetic material mounted in the internal space of the outer ring bounded by the upper edge of the spiral magnetic material and the inside surface of the outer ring.

Also disclosed is an assembly of fillers for electromagnetic filters comprising a plurality of such fillers stacked and held together by means of a shaft extending through the central apertures of the spiral magnetic materials.

6 Claims, 5 Drawing Figures

FILLER FOR ELECTROMAGNETIC FILTERS

OBJECTS OF THE INVENTION

The above-described filler and assembly of fillers can prevent the entrapment of magnetic particles suspended in the feed water from being interfered with by the compressive deformation of lower layers of the woolly magnetic material under the weight of the overlying spiral magnetic material, and the ensuing reduction in the porosity thereof. Moreover, they greatly facilitates the placement in a filtering column and/or removal therefrom of the magnetic materials.

TECHNICAL FIELD

This invention relates to a filler for electromagnetic filters comprising a combination of spiral and woolly magnetic materials and to an assembly of fillers for electromagnetic filters comprising a plurality of such fillers stacked and held together.

BACKGROUND ART

An electromagnetic filter is an apparatus for removing magnetic particles suspended in feed water by magnetic attraction to the magnetic material filling the internal space of a filtering column and is used in such applications as the removal of magnetic particles, for example, of iron oxide contained in the condensate from a power station. The electromagnetic filter further includes an electromagnetic coil disposed around the filtering column filled with the magnetic material, and a rectifier for supplying a direct current to the electromagnetic coil. For the purpose of removing magnetic particles suspended in feed water, the rectifier is used to convert an alternating current into a direct current, which is supplied to the electromagnetic coil. The magnetic flux so produced serves to magnetize the magnetic material within the filtering column. Then, feed water is passed through the filtering column, so that magnetic particles suspended therein are entrapped by magnetic attraction to the magnetic material. After the amount of magnetic particles entrapped in the magnetic material has reached an appreciable level, the passage of water is discontinued and the supply of a direct current to the electromagnetic coil is shut off to demagnetize the magnetic material. Subsequently, the magnetic material is cleaned with water or air so that the magnetic particles entrapped in the magnetic material may be expelled from the filtering column. In this manner, the passage of water and the cleaning operation are performed alternately.

The magnetic materials suitable for use in electromagnetic filters include ball-shaped magnetic materials, spiral magnetic materials, woolly magnetic materials, and the like. However, these magnetic materials have their own merits and demerits. Thus, it is most preferable to use spiral and woolly magnetic materials arranged in a large number of alternating layers.

However, if the filtering column is simply filled with a large number of alternating layers of spiral and woolly magnetic materials, lower layers of woolly magnetic material undergoes compressive deformation under the weights of the overlying spiral magnetic materials and, hence, the porosity thereof is reduced to interfere with the entrapment of magnetic particles. Moreover, this arrangement has the disadvantage that troublesome operations are required for placing the magnetic materials in the filtering column and/or removing them from the filtering column.

DISCLOSURE OF THE INVENTION

It is an object of the present invention to provide novel means for, in a filtering column filled with a large number of alternating layers of spiral and woolly magnetic materials, preventing the entrapment of magnetic particles suspended in the feed water from being interfered with by the compressive deformation of lower layers of the woolly magnetic material under the weight of the overlying spiral magnetic materials, and the ensuing reduction in the porosity thereof.

It is another object of the present invention to provide novel means for, in a filtering column filled with a large number of alternating layers of spiral and woolly magnetic materials, facilitating the placement in the filtering column and/or removal therefrom of the magnetic materials.

The above objects of the present invention are accomplished by a filler for electromagnetic filters comprising a spiral magnetic material having an aperture in its center, an outer ring surrounding the spiral magnetic material and having a thickness greater than that of the spiral magnetic material, and a woolly magnetic material mounted in the internal space of the outer ring bounded by the upper edge of the spiral magnetic material and the inside surface of the outer ring, and by an assembly of fillers for electromagnetic filters comprising two or more such fillers stacked and held together by means of a shaft extending through the central apertures of the spiral magnetic materials.

BEST MODE FOR CARRYING OUT THE INVENTION

The present invention will hereinafter be described in detail with reference to the accompanying drawings which are presented for purposes of illustration only and are not intended to limit the scope of the invention.

Figure 1:
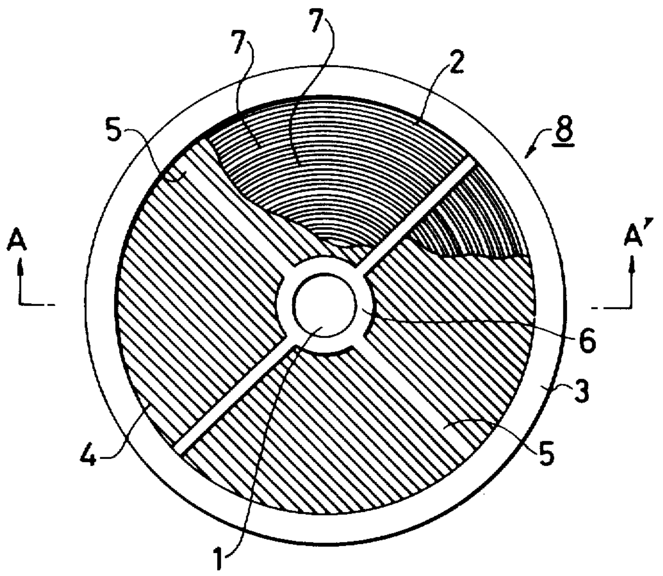
FIG. 1 is a partially cutaway plan view of a filler embodying the present invention.
Figure 2:
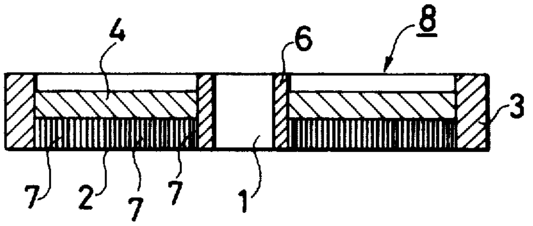
FIG. 2 is a vertical sectional view taken along the line A—A' of FIG. 1.

FIG. 1 is a partially cutaway plan view of a filler for electromagnetic filters made in accordance with one embodiment of the present invention, and FIG. 2 is a vertical sectional view taken along the line A—A' of FIG. 1.

In the embodiment of the present invention as illustrated in FIGS. 1 and 2, a filler for electromagnetic filters includes a spiral magnetic material 2 having an aperture 1 in its center. This spiral magnetic material 2 is mounted in the lower part of an outer ring 3, and an inner ring 6 having ribs 5 extending radially therefrom is fitted into aperture 1. As a result, the internal space of outer ring 3 bounded by the upper edge of spiral magnetic material 2, the inside surface of outer ring 3, and the outside surface of inner ring 6 is divided into fan-shaped sections by ribs 5. Finally, a woolly magnetic material 4 is mounted in these sections of the internal space. In FIG. 1, the internal space for receiving woolly magnetic material 4 is divided into 4 sections by ribs 5. However, the number of the sections into which the internal space should be divided is within the limits of design latitude and can be determined at will.

Where the spiral magnetic material 2 is of small diameter, the provision of ribs 5 and inner ring 6 may be omitted. In this case, the woolly magnetic material 4 is mounted in the doughnut-shaped internal space of outer ring 3 bounded by the upper edge of spiral magnetic material 2 and the inside surface of outer ring 3. According to circumstances, it is also possible to omit the provision of ribs 5 alone.

The spiral magnetic material 2 used in the practice of the present invention comprises a spirally coiled strip 7 made of a material (for example, SUS 430, amorphous magnetic material, etc.) which becomes magnetized when placed in a magnetic field. Consequently, if water containing suspended magnetic particles is passed through the gaps between adjoining turns of strip 7, the magnetic particles are entrapped therein by magnetic attraction. The thickness of strip 7 is usually of the order of 0.5 to 2 mm, but tape-like materials having a thickness of less than 0.5 mm may be used according to circumstances. The woolly magnetic material 4 used in the practice of the present invention comprises a mass of thin wires, 40 to 500μ in diameter, made of a material (for example, SUS 430, amorphous magnetic material, etc.) which becomes magnetized when placed in a magnetic field, or a mass of very thin, elongated tapes, 40 to 500 μ in width and 10 to 50 μ in thickness, made of a material as described above. Consequently, if water containing suspended magnetic particles is passed through the interstices of woolly magnetic material 4, the magnetic particles are entrapped therein by magnetic attraction.

It is desirable that the outer ring 3, inner ring 6 and ribs 5 used in the practice of the present invention are made of a non-magnetic material (for example, SUS 304 and the like) which does not become magnetized when placed in a magnetic field.

Figure 3:
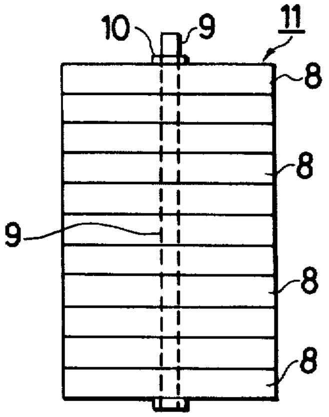
FIG. 3 and 4 are elevational views illustrating two different forms of the assembly of fillers in accordance with the present invention.

The construction of filler 8 made in accordance with one embodiment of the present invention is as described above in connection with FIGS. 1 and 2. In placing such fillers in the filtering column of an electromagnetic filter, it is convenient to use an assembly 11 of fillers which, as illustrated in FIG. 3, comprises a plurality of fillers 8 stacked and held together by inserting a shaft 9 in apertures 1 and tightening them with a nut 10. If desired, a hook (not shown) may be provided, for example, at the upper end of shaft 9 so that the assembly 11 can be hung thereby. This permits a large number of fillers 8 to be placed in or removed from a filtering column in a short period of time.

Figure 4:
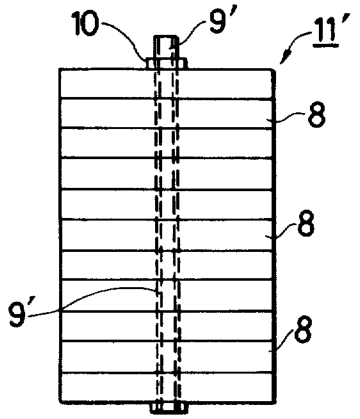
Figure 5:
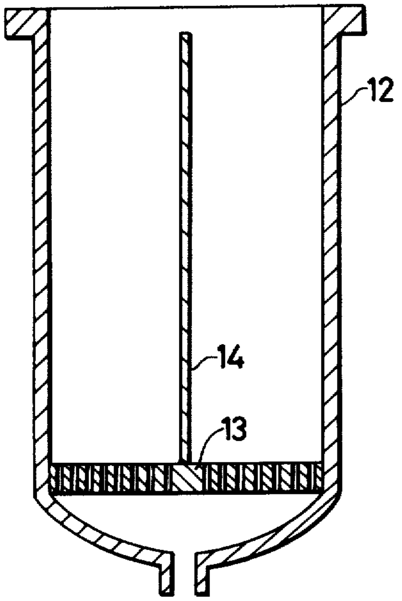
FIG. 5 is a vertical sectional view of a filtering column.

In an alternative arrangement, a hollow shaft 9' is used as illustrated in FIG. 4. In addition, as illustrated in FIG. 5, a support rod 14 is mounted on a perforated plate 13 lying in the lower part of filtering column 12 so as to be positioned vertically at the center of the internal space of filtering column 12. Thus, by fitting hollow shaft 9' (FIG. 4) over support rod 14, the center of apertures 1 can be brought into exact alignment with that of filtering column and, moreover, the assembly 11' can be secured within filtering column 12.

It is to be understood that, after the assembly 11' is placed in filtering column 12 as described above in connection with FIG. 5, an end plate (not shown) is mounted at the top of filtering column 12.

In the arrangement illustrated in FIG. 3, the shaft 9 may have an extended lower end portion which is threaded so as to cooperate with a nut. In this case, an opening for receiving the lower end portion of shaft 9 must be made in the center of perforated plate 13. Thus, the assembly 11 can be secured within filtering column 12 by inserting the lower end portion of shaft 9 in the hole and tightening it with a nut from the underside of perforated plate 13.

Alternatively, a plurality of individual fillers 8 as illustrated in FIGS. 1 and 2 may be separately placed in a filtering column as illustrated in FIG. 5 so that the support rod 14 extends through the central apertures thereof. Subsequently, the fillers can be secured by tightening with a nut provided at the top of support rod 14.

As can be seen from the above description, the filler of the present invention is characterized in that the woolly magnetic material is protected by the outer ring. Accordingly, even if the spiral and woolly magnetic materials are arranged in a large number of alternating layers, none of the woolly magnetic material is placed under the weight of the spiral magnetic materials. As a result, the woolly magnetic material is free from compressive deformation and the ensuing reduction in the porosity thereof. Thus, the present invention enables magnetic particles suspended in the feed water to be effectively entrapped by magnetic attraction to the spiral and woolly magnetic materials.

According to another feature of the present invention, the spiral and woolly magnetic materials are united into a single filler which is easy to handle. Moreover, an easier-to-handle assembly of fillers can be formed by stacking a plurality of such fillers and holding them together by means of a shaft, so that the placement in a filtering column and/or removal therefrom of the magnetic materials is greatly facilitated.

We claim:

1. An assembly of fillers for electromagnetic filters comprising two or more fillers each of which is comprised of a spiral magnetic material having an aperture in its center; an outer ring surrounding said spiral magnetic material and having a thickness greather than that of said spiral magnetic material; and a woolly magnetic material mounted in the internal space of said outer ring bounded by the upper edge of said sprial magnetic material and the inside surface of said outer ring; said fillers being stacked and held together by means of a shaft extending through the central apertures of said spiral magnetic materials.

2. An assembly of fillers for electromagnetic filters as claimed in claim 1, wherein an inner ring having ribs extending radially therefrom is fitted into the central aperture of said spiral magnetic material and said woolly magnetic material is mounted in the sections into which said internal space is divided by said ribs.

3. An assembly of fillers for electromagnetic filters as claimed in claim 1 or 2 wherein a hook for hanging said assembly of fillers is provided at the upper end of said shaft.

4. An assembly of fillers for electromagnetic filters as claimed in claim 1 or 2 wherein said shaft comprises a hollow shaft adapted to fit over a support rod positioned vertically at the center of the internal space of a filtering column.

5. An asembly of fillers for electromagnetic filters as claimed in claim 1 or 2 wherein said shaft has a threaded lower end portion so that, when said assembly of fillers is placed in a filtering column with said lower end portion of said shaft extending through an opening made in the center of a perforated plate within said filtering column, said assembly of fillers can be secured within said filtering column by tightening said shaft with a nut from the underside of said perforated plate.

6. An electromagnetic filter comprising a filtering column filled with an assembly of fillers for electromagnetic filters as claimed in claim 1 or 2, and an electromagnetic coil disposed around said filtering column.

* * * * *